July 2, 1968   B. E. SHLESINGER, JR   3,391,261
ELECTRICAL SWITCH AND METHOD OF MANUFACTURE AND OPERATION
UTILIZING INJECTION MOLDING TECHNIQUES
Filed Sept. 16, 1966   3 Sheets-Sheet 1
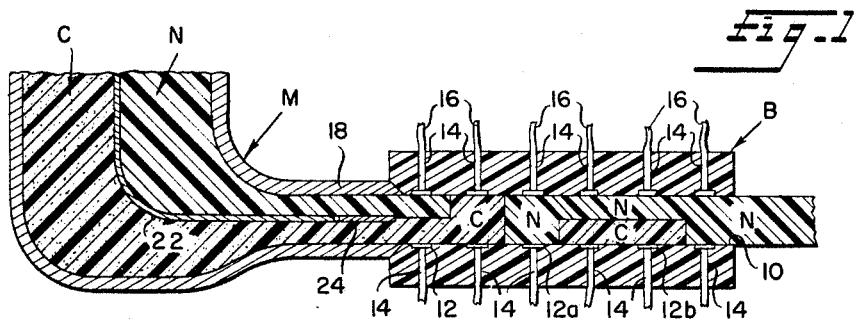
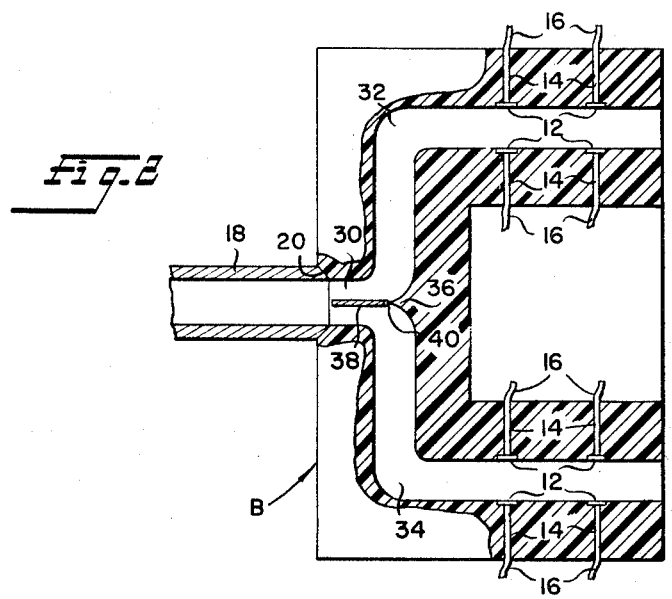
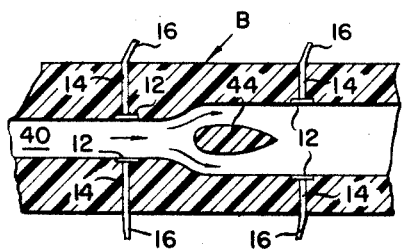
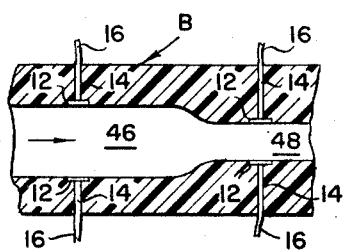
INVENTOR
Bernard Edward Shlesinger Jr July 2, 1968  B. E. SHLESINGER, JR  3,391,261
ELECTRICAL SWITCH AND METHOD OF MANUFACTURE AND OPERATION
UTILIZING INJECTION MOLDING TECHNIQUES
Filed Sept. 16, 1966  3 Sheets-Sheet 2

INVENTOR

Bernard Edward Shlesinger Jr

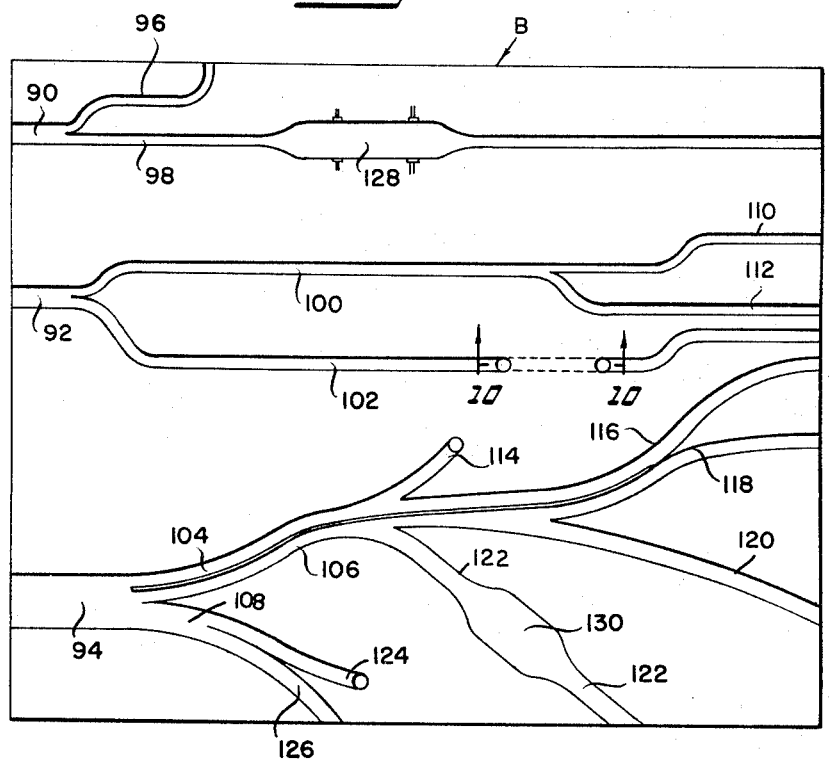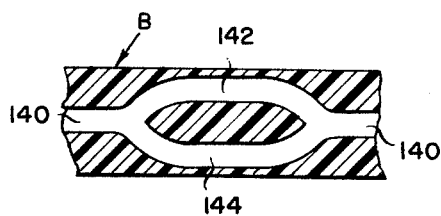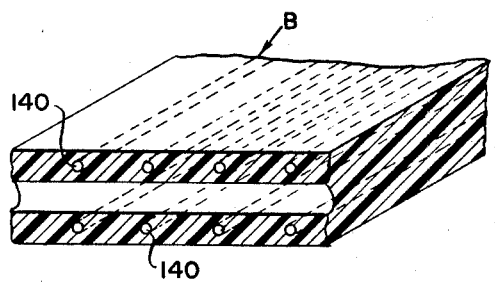

United States Patent Office 3,391,261
Patented July 2, 1968

3,391,261
ELECTRICAL SWITCH AND METHOD OF MANUFACTURE AND OPERATION UTILIZING INJECTION MOLDING TECHNIQUES
Bernard Edward Shlesinger, Jr., 3906 Bruce Lane, Annandale, Va. 22003
Filed Sept. 16, 1966, Ser. No. 580,059
14 Claims. (Cl. 200—46)

ABSTRACT OF THE DISCLOSURE

An electrical switching method for operating electrical circuit means comprising: injecting in a programmed period of time a controlled and metered amount of flowable conductive plastic material into a switchblock along a predetermined path having contact means associated therewith; injecting in a programmed period of time a controlled and metered amount of flowable non-conductive plastic material into said switchblock along said predetermined path so as to form an interface with said conductive material; moving said materials through said block and past said contact means by controlled pressure means; thereby to operate said electrical circuit means for a predetermined period of time.

---

This invention relates to program switches, their construction method of operation and method of manufacture involving the injection of a plastic material into a switch block for the purpose of causing the switch to operate in a programmed sequence or for the purpose of producing a manufactured switch block. This invention is somewhat similar to my U.S. Patent 3,193,630 issued July 6, 1965, and to my U.S. Patent application Ser. No. 338,478 filed Jan. 17, 1964, now U.S. Patent 3,354,434 issued Nov. 21, 1967. It is also somewhat analogous to my U.S. application Ser. No. 478,588 filed Aug 10, 1965.

Prior art program switches have been limited by being complex, difficult to repair, and not easily adaptable for different types of equipment and jobs. Because of the amount of hardware generally involved, block switches are generally quite complex and expensive and if there are a great many circuits involved, difficult to change over.

It is an object of this invention to provide a switch block for programming systems which is inexpensive to manufacture and so reasonable as to cost that it can be thrown away when no longer of use.

Another object of this invention is to provide a contact switch programming system which is easily adaptable to various types of equipment and tasks.

A further object of this invention is to provide a programming switch system which is fast, trouble free, and interchangeable.

Another object of this invention is to provide a multiple contact switch programming system for use in computing and the like. Still a further object of this invention is to provide a programming system which can be selectively changed without disassembly. Yet a further object of this invention is to provide a programming system which can be used in simple contact switching arrangements or a complex switching arrangements.

Another object of this invention is to provide a programming system which is capable of being repetitive, or discontinous as desired.

It is a further object of this invention to incorporate the use of plastic materials having both conductive and non-conductive properties.

Another object of this invention is to provide an electrical switch block which has no moving parts subject to wear or erosion.

Another object of this invention is to provide an electrical switch block which may be programmed to a certain sequence and subsequently reprogrammed to a different sequence by the use of injection molding techniques.

Still another object of this invention is to provide a pre-assembly block which will be readily available on the job for immediate connection to an injection molding machine which will inject desired programmed information on the job.

A further object of this invention is to eliminate the need for expensive materials such as metals and the like in the contact areas and substitute inexpensive plastic materials therefore.

These and other objects and advantages of this invention will be apparent from the following description and claims.

In the accompanying drawings which illustrate by way of example various embodiments of this invention:

FIGURE 1 is a fragmentary cross sectional view in side elevation showing the injection molding apparatus connected to the switch block;

FIGURE 2 is a fragmentary top plan view broken away and illustrating the switch block;

FIGURE 3 and FIGURE 4 are enlarged fragmentary cross sectional views illustrating two different embodiments of the invention;

FIGURE 9 is a top plan view broken away illustrating somewhat schematically various embodiments of this invention;

FIGURE 10 is an enlarged cross section view taken along the lines 10—10 of FIGURE 9 and viewed in the direction of the arrows; illustrating yet another embodiment of this invention;

FIGURE 11 is an isometric view partially in cross section showing heating elements in the switch block.

SUMMARY

Figure 5:
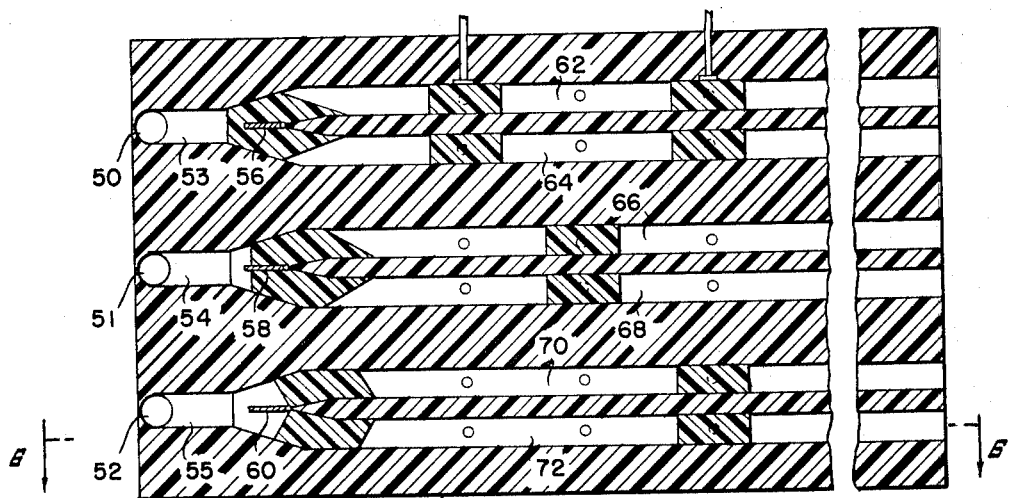
FIGURE 5 is a fragmentary top plan view broken away illustrating yet another embodiment of this invention.

This invention relates not only to a method for electrical switching, but also to a method of manufacturing a switch block and the pre-assembly block used in the manufacture of the switch block. The invention utilizes the principles of injection molding by injecting into certain cavities in the switch block pre-selected amounts of conductive and non-conductive plastic serially so as to be positioned upon completion of the injection process, beneath certain predetermined contact surfaces in the block for connecting certain circuits.

FIGURE 1

For the purpose of clarity, in the drawings, B indicates the switch block. The injector molding machine is generally indicated by M. The conductive plastic is generally indicated by C and non-conductive plastic is indicated N.

In FIGURE 1, the block B includes an opening 10 therein which may be of any desired shape and configuration as will subsequently be obvious. Entering into the block B are a series of contacts 12 which protrude or are flush with the wall of the through channel or opening 10. The contacts 12 are connected to the surface of the block B by conductors 14 which may be connected to printed circuits on the surface of the block B (not shown) or leads 16 or the like.

In the injection molding machine M the nozzle 18 is connected to the block B as at 20. The injection molding machine includes a divider 22 which separates two charges; one of conductive material as indicated by C and the other of non-conductive material as indicated by N. A pivoted valve member 24 permits extrusion of both or either of the materials C and N.

For the purpose of this invention, the plastic supplied to the injection molding machine M may be of the thermoplastic or thermosetting variety as desired. Any plastic material available may be utilized and a number of conductive plastics are presently on the market for molding purposes or the like. Some of these plastics which have conductivity are available in both thermosetting and thermoplastic compositions.

OPERATION

In operation, the plastic material is injected under pressure into the block B in a pre-programmed sequence of conductive C and non-conductive units N of material as illustrated. If it is intended for the material to be injected into the block for purpose of permanent setting up therein, the injection will continue until the material just emerges from the block B. If a continuous programming switching system is to be used, continuous ejection of the material from the end of the block B will result in a pile up of material. The material may be recovered and subsequently used for other purposes or possibly reclaimed for utilization as all conductive material by adding additional conductive filler such as carbon or the like to make up for the absence thereof in the non-conductive material associated with the waste. If the blocks B are to be utilized for a long period of time, it may be preferable to use a thermosetting type composition. If it is intended that the blocks B be subsequently refilled by some other type program, then, it might be more desirable to inject a thermoplastic composition which can be forced out by applying heat to the block B or solvent or the like.

The pressure of injection may be varied to increase the speed of flow or decrease the speed of flow in the block B for purposes of continuously changing the circuitry. The length of charge for example, the conductive material injected, will effect the period of time of operation of a particular circuit where continuous injection is used. The amount of material is controlled by the valve 24 and the valve is pivoted so as to permit the non-conductive material to be injected when the valve 24 is down and the conductive material to be injected when the valve is up. In the horizontal position, the valve 24 permits injection of both the conductive and the non-conductive materials so that there is lateral transmission of conductivity as noted in FIGURE 1 in one of the sequences illustrated and specifically between the contacts 12a and 12b. In the case of ejecting the material as aforementioned, air or a second charge or a solvent may be used. Softening as aforementioned can be done in numerous ways one of which is set out subsequently in this description. The block B must be constructed of a non-conductive material and where plastic is used, it must be unaffected by temperature in the case of utilization of thermosetting resins for injection purposes. The thermosetting resin such as a phenol or the like would be the more appropriate material to construct a block since it has a high heat resistance and would not be destroyed with heats necessary to cause a thermoplastic resin to flow.

FIGURE 2

In FIGURE 2, the injection nozzle 18 is brought into contact with the block B. The main flow channel 30 in the block B is divided into branches 32 and 34. A projection divider 36 extends into the channel 30 so as to divide the stream of incoming injected material into two streams flowing into branches 32 and 34. A butterfly type valve 38 which pivots on a pivot 40 is moveable from side-to-side or centrally located so as to divide the stream or so as to shift the entire main flow in the main channel 30 into either of the branch channels 32 or 34 or into both channels. Depending upon the angle at which the valve 38 is set, more or less material can be switched into one of the branches 32 and 34. Contacts 12 with their conductors 14 and leads 16 may be positioned as desired in the block B.

The pivot pin 40 will extend through the block B and be fixed to rotating means enabling the operator to adjust the butterfly valve 38 to the desired angle. Indicia (not shown) would be provided for making accurate adjustments. It will be obvious that similar butterfly valves 38 can be provided in any of the other channels or branches or tributaries of the block B.

FIGURES 3 AND 4

In FIGURE 3, the block B has a narrow main channel 40 which broadens into a wider channel 42. At the juncture of channel 40 and 42 is a deflector member 44 of somewhat tear-shaped design. The deflector 44 aids in distributing and causing proper flow into all areas of the wider channel 42 so that the material will tend to hug the side walls of the channel 42 as it flows from the narrow channel 40. It will be obvious that the forward flow of the injected plastic will be slower in the wider channel 42 than in the narrow channel 40. This means that the contact members 12 will be more slowly connected in the wider channel 42 than in the narrow channel 40.

In FIGURE 4 the wider channel 46 narrows down to a channel 48. The slow speed of flow in the channel 46 increases when the material enters channel 48. This means that the contacts 12 in the channel 48 will be closed more rapidly than in the channel 46 for the same injection pressure.

FIGURES 5 AND 6

Figure 6:
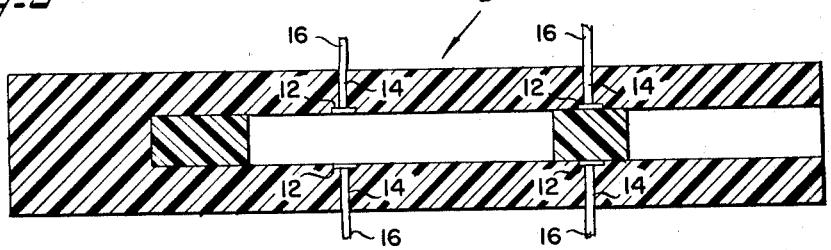
FIGURE 6 is a fragmentary cross sectional view taken along the lines 6—6 in FIGURE 5 and viewed in the direction of the arrows.

In FIGURES 5 and 6, the block B is provided with a series of injection parts 50, 51 and 52 which may be alternately connected to a single injection molding machine or to a plurality of injection molding machines or to a single molding machine having a plurality of nozzles for simultaneously injecting into channels 53, 54 and 55. In the block B shown in FIGURES 5 and 6, dividers 56, 58 and 60 are similar to valve 38 in FIGURE 2 are provided to control the flow of material into branches 62, 64, 66, 68, 70 and 72 as desired. It will be obvious that various combinations can be worked out by controlling the valves or dividers 56, 58 and 60 so that more or less conductive or non-conductive material can be shifted into the branches 62 through 72.

FIGURES 7 THROUGH 10

Figure 7:
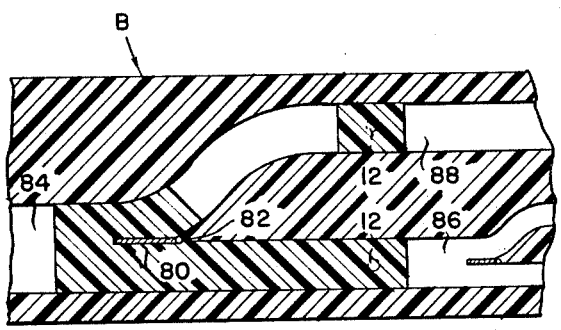
FIGURE 7 is an enlarged fragmentary top plan view illustrating at another embodiment of this invention.
Figure 8:
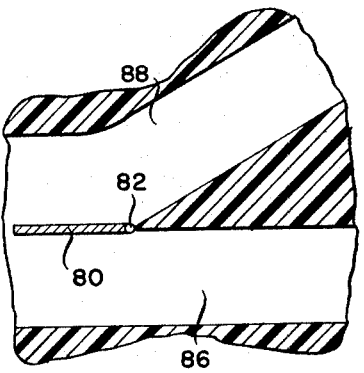
FIGURE 8 is an enlarged fragmentary top plan view broken away to illustrate one specific feature shown in FIGURE 7.

In FIGURE 7, the divider or flow control valve 80 as best illustrated in FIGURE 8 and having a pivot pin 82 similar to pin 40 in FIGURE 2 is set slightly into the main stream of the channel 84 and narrows the channel 84 into a small channel 86 and divides the channel 84 into a branch channel 88.

FIGURE 9 illustrates a board B having various confirgurations and intricate designs for controlling the flow of injected material and for setting up different types of combinations and switching mechanisms as desired. Any number of main channels 90 and 92 and 94 can be developed to provide branches 96, 98, 100, 102, 104, 106, 108, 110 and tributaries 112, 114, 116, 118, 120, 122, 124 and 126.

Widening channels 128 and 130 can be provided as desired.

FIGURE 10 which is an enlargement of a portion of the arrangement illustrated in FIGURE 9 shows how a three dimensional affect can be obtained permitting utilization of additional circuits and permitting more intricate programming. In this figure, the channel 140 is divided into channels 142 and 144 which are in different vertical planes than the main channel 140. The channels 142 and 144 eventually come back again into channel 140 as noted.

FIGURE 11

In FIGURE 11 the block B is provided with various heating elements 140 which may be wires or coils for permitting the flow of fluid there-through for the purpose of heating the thermoplastic material to permit the thermoplastic material to be melted for purposes of removal from the block B as heretofore described.

It will be obvious that locating the contacts 12 in various positions in block B will provide considerable flexibility of programming and by proper design of the channels, additional programming systems can be worked out.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. An electrical switching method for operating electrical circuit means comprising:
    (a) injecting in a programmed period of time a controlled and metered amount of flowable conductive plastic material into a switchblock along a predetermined path having contact means associated therewith
    (b) injecting in a programmed period of time a controlled and metered amount of flowable non-conductive plastic material into said switchblock along said predetermined path so as to form an interface with said conductive material
    (c) moving said materials through said block and past said contact means by controlled pressure means
    (d) thereby to operate said electrical circuit means for a predetermined period of time.

2. An electrical switching method as in claim 1 and including:
    (a) ejecting said controlled amount of materials from said block after operation of said electrical circuit means.

3. An electrical switching method as in claim 1 and including:
    (a) injecting simultaneously into said block both conductive and non-conductive materials so as to form stratified layers transversely disposed in said predetermined path.

4. An electrical switching method as in claim 1 and including:
    (a) injecting said conductive and non-conductive materials into said block so that portions along said path are stratified transversely thereof and other portions are stratified longitudinally.

5. An eltctrical switching method as in claim 1 and including:
    (a) varying the controlled pressure means in a programmed period of time to increase or decrease the speed of flow of said materials through said block.

6. An electrical switching method as in claim 5 and wherein:
    (a) the amount of controlled conductive material injected is less than the amount of non-conductive material.

7. An electrical switching method as in claim 5 and wherein:
    (a) the amount of controlled conductive material injected is more than the amount of non-conductive material.

8. An electrical switching method as in claim 1 and wherein:
    (a) said amounts of flowable conductive and non-conductive materials are subsequently divided and directed into additional paths having second contact means associated therewith and moved past said second contact means
    (b) thereby to operate additional electrical circuit means.

9. An electrical switching method as in claim 8 and wherein:
    (a) said divided materials are subsequently reassembled into a single path having third contact means therein and moved past said third contact means
    (b) thereby to operate still additional electrical circuit means.

10. An electrical switching method as in claim 1 and including:
    (a) injecting in a programmed period of time said conductive materials simultaneously into a plurality of separate paths in said block each having contact means associated therewith and moving said materials past said contact means
    (b) thereby to operate simultaneously a plurality of electrical circuit means.

11. An electrical switching method as in claim 8 and including:
    (a) subdividing said divided materials and directing the subdivided materials into further additional paths having third contact means associated therewith and moving the subdivided materials past said third contact means
    (b) thereby to operate still additional electrical circuit means.

12. An electrical switching method as in claim 1 and including:
    (a) slowing down the speed of movement of said materials in certain areas of said block as compared with other areas.

13. An electrical switching method as in claim 1 and including:
    (a) increasing the speed of movement of said materials in certain areas of said block as compared with other areas.

14. An electrical switching method as in claim 1 and including:
    (a) applying heat to said block to increase the speed of flow of said materials.

References Cited

UNITED STATES PATENTS

| | | | |
|---|---|---|---|
| 375,403 | 12/1887 | Waterhouse | 200—152.9 X |
| 1,774,658 | 9/1930 | Muller | 200—152.9 X |
| 2,227,461 | 1/1941 | Morin et al. | 264—40 X |
| 2,672,653 | 3/1954 | Simpkins et al. | 18—36 X |
| 2,832,826 | 4/1958 | Hagelin | 178—22 |
| 2,901,580 | 8/1959 | Kelly | 200—152.9 |
| 2,981,868 | 4/1961 | Severson | 174—68.5 X |
| 3,193,630 | 7/1965 | Shlesinger | 200—16 |
| 3,274,327 | 9/1966 | Schnitzler | 174—68.5 |

FOREIGN PATENTS

| | | |
|---|---|---|
| 28,834 | 12/1913 | Great Britain. |
| 1,386,216 | 12/1964 | France. |

OTHER REFERENCES

Green, "Printed Circuit Packaging," IBM Technical Disclosure Bulletin, vol. 3, No. 12, May 1961, p. 5 (relied upon).

BERNARD A. GILHEANY, *Primary Examiner.*

F. BELL, *Assistant Examiner.*